(12) United States Patent
Lim et al.

(10) Patent No.: US 12,274,591 B2
(45) Date of Patent: Apr. 15, 2025

(54) DENTAL BLANK

(71) Applicant: HASS CO., LTD., Gangneung-si (KR)

(72) Inventors: Hyung Bong Lim, Ansan-si (KR);
Hwan Soon Koh, Anyang-si (KR);
Joon Hyung Kim, Anseong-si (KR);
Sung Ho Ha, Ansan-si (KR); Yong Su Kim, Gangneung-si (KR)

(73) Assignee: HASS CO., LTD., Gangneung-si (KR)

( * ) Notice: Subject to any disclaimer, the term of this patent is extended or adjusted under 35 U.S.C. 154(b) by 0 days.

(21) Appl. No.: 18/301,313

(22) Filed: Apr. 17, 2023

(65) Prior Publication Data

US 2023/0248492 A1 Aug. 10, 2023

Related U.S. Application Data

(62) Division of application No. 17/368,440, filed on Jul. 6, 2021, now abandoned.

(30) Foreign Application Priority Data

Aug. 21, 2020 (KR) ........................ 10-2020-0105643

(51) Int. Cl.
*A61C 13/00* (2006.01)
(52) U.S. Cl.
CPC ...... *A61C 13/0022* (2013.01); *A61C 13/0006* (2013.01); *Y10T 428/12229* (2015.01)
(58) Field of Classification Search
CPC ....... A61C 13/0022; Y10T 428/12229–12257; B23Q 3/062; B23Q 2703/10
See application file for complete search history.

(56) References Cited

U.S. PATENT DOCUMENTS

| | | | |
|---|---|---|---|
| 9,675,433 | B2 | 6/2017 | Cornell |
| 10,524,887 | B2 | 1/2020 | Reynaud et al. |
| 2003/0132539 | A1 | 7/2003 | Althoff |
| 2006/0172263 | A1 | 8/2006 | Quadling et al. |
| 2011/0291343 | A1 | 12/2011 | McMurtry et al. |
| 2014/0147225 | A1 | 5/2014 | Cornell et al. |
| 2018/0110598 | A1 | 4/2018 | Ito et al. |
| 2018/0257187 | A1 | 9/2018 | Grobbee |

FOREIGN PATENT DOCUMENTS

| | | | | |
|---|---|---|---|---|
| CN | 103003041 A | | 3/2013 | |
| CN | 107427346 A | | 12/2017 | |
| DE | 202010001125 U1 | * | 5/2010 | ......... A61C 13/0022 |
| DE | 102013210203 A1 | | 12/2014 | |

(Continued)

OTHER PUBLICATIONS

Translation of DE202010001125 (Year: 2010).*

(Continued)

*Primary Examiner* — Matthew P Travers
(74) *Attorney, Agent, or Firm* — NKL LAW; Jae Youn Kim

(57) ABSTRACT

Provided is a dental blank. The dental blank includes: a seating portion provided in an artificial tooth processing apparatus; and a material portion configured to be inserted into the seating portion, wherein the material portion includes a plurality of outer contacting portions in contact with an inner side of the seating portion, and may have a polygonal shape in a cross-section.

2 Claims, 11 Drawing Sheets

(56) References Cited

FOREIGN PATENT DOCUMENTS

| | | |
|---|---|---|
| EP | 2807990 A2 | 12/2014 |
| EP | 2889105 A1 | 7/2015 |
| EP | 3045145 A2 | 7/2016 |
| EP | 3272306 A1 | 1/2018 |
| JP | 2008018501 A | 1/2008 |
| JP | 2010-022610 A | 2/2010 |
| JP | 2014-168707 A | 9/2014 |
| KR | 10-2013-0045861 A | 5/2013 |
| KR | 10-1314192 B1 | 10/2013 |
| KR | 10-1382382 B1 | 4/2014 |
| KR | 10-1963519 B1 | 7/2019 |
| KR | 10-1997032 B1 | 10/2019 |
| WO | 2016/148289 A1 | 9/2016 |
| WO | 2016148287 A1 | 9/2016 |

OTHER PUBLICATIONS

Translation of DE102013210203 (Year: 2014).*
European Patent Office, Extended European Search Report for European Patent Divisional Application No. 23172695.1, Sep. 28, 2023 (communicated on Sep. 25, 2023).

* cited by examiner

DENTAL BLANK

CROSS REFERENCE TO RELATED APPLICATION

This application is a divisional application of U.S. application Ser. No. 17/368,440 filed on Jul. 6, 2021, which claims priority to Korean Patent Application No. 10-2020-0105643, filed Aug. 21, 2020, the entire contents of which is incorporated herein for all purposes by this reference.

BACKGROUND OF THE INVENTION

Field of the Invention

The present disclosure relates to a dental blank. More particularly, the present disclosure relates to a dental blank capable of preventing a material portion from being broken and capable of increasing productivity.

Description of the Related Art

When a loss of a tooth occurs by a tooth fracture, or by damaging or defecting of a tooth caused by a cavity, or the like, a procedure of manufacturing a dental restoration or a dental prosthesis is performed. The procedure of manufacturing a dental prosthesis refers to all procedures that produce an artificial tooth that is to be the most similar to a natural tooth and affixes or crowns the artificial tooth after removing a part or entire of a tooth. In a dental prosthesis, when a tooth shape is reproduced by pouring a plaster to a tooth form of a patient reproduced by an impression procedure or the tooth shape is obtained through an intra oral scanning procedure, a desired tooth can be designed on a screen through a computer-aided design (CAD) process and the dental prosthesis is processed automatically at a processing apparatus using a computer-aided design (CAD)/a computer-aided manufacturing (CAM).

In general, as illustrated in FIG. 12, the processing apparatus using CAD/CAM produces the dental prosthesis by processing a workpiece 91 with a processing tool 92 after fixing the workpiece 91 to a jig 90 by fastening a fixing table 94 to a seating table 93 by bolts 95 while the workpiece 91 having a disc shape is inserted in the seating table 93.

Since the workpiece 91 in the conventional art has a disc shape, among regions of the workpiece 91 to be processed, a peripheral region of a portion in contact with the fixing table 94 or the seating table 93 has to be defined as a region in which processing is impossible in order for performing a cutting movement of a tool of the processing tool 92 without being interfered by the fixing table 94 or the seating table 93. Therefore, the workpiece 91 inevitably includes a dead space that is a space impossible to be processed to be the dental prosthesis, so that there is a problem in that productivity of a dental prosthesis is low.

In addition, the workpiece 91 is fixed to the jig 90 with being in contact directly with the seating table 93 or the fixing table 94 over a wide area along the circumference thereof. That is, the workpiece 91 is in surface contact directly with the seating table 93 or the fixing table 94 that are solid, and there may be a problem in that the workpiece 91 may be broken by an instantaneously concentrated stress when the tool of the processing tool 92 contacts the workpiece 91.

SUMMARY OF THE INVENTION

Accordingly, the present disclosure has been made keeping in mind the above problems occurring in the related art, and an objective of the present disclosure is to provide a dental blank capable of minimizing a dead space by using a material portion having a polygonal shape and capable of increasing production efficiency of a dental prosthesis.

In addition, another objective of the present disclosure is to provide a dental blank capable of reducing the consumption of a material portion caused by a crack by protecting the material portion from an external force by using a guard portion such that the material portion does not directly contact with a seating portion or a fixing portion.

According to an embodiment of the present disclosure, the dental blank may include: a seating portion provided in an artificial tooth processing apparatus; and a material portion configured to be inserted into the seating portion, wherein the material portion may include a plurality of outer contacting portions in contact with an inner side of the seating portion, and has a polygonal shape in a cross-section. According to an embodiment of the present disclosure, the outer contacting portions may be in linear contact with an inner side surface of the seating portion along an insertion direction that the material portion is inserted into the seating groove.

According to an embodiment of the present disclosure, the material portion may include a guard portion in contact with a side portion of the material portion and configured to protect the material portion. According to an embodiment of the present disclosure, the guard portion may be positioned to surround a side surface of the material portion. According to an embodiment of the present disclosure, the guard portion may have a polygonal shape in a cross-section. According to an embodiment of the present disclosure, the guard portion may be positioned at an upper portion or a lower portion of the material portion. According to an embodiment of the present disclosure, the seating portion may include a seating groove in which the material portion is seated, the seating groove having a circular shape in a cross-section. According to an embodiment of the present disclosure, a dental prosthesis processed by the artificial tooth processing apparatus may be formed at the material portion.

According to the dental blank of the present disclosure, spreading of an external force applied to the material portion may be prevented by the material portion having a polygonal shape, and the consumption of the material portion caused by a crack may be reduced.

In addition, according to the dental blank of the present disclosure, an abrasion of a processing tool may be reduced by reducing an inserting load by forming tool entrance portions, and a border region of the material portion may be processed, so that the dead space of the material portion may be reduced and production efficiency of the dental prosthesis may increase.

In addition, according to the dental blank of the present disclosure, a stress, an impact, etc., that are transferred from the processing apparatus may be relieved by the guard portion, so that a breakage of the material portion may be prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Advantages and features of the present disclosure, and a method of achieving them will become apparent with reference to the exemplary embodiments described below in detail together with the accompanying drawings.

However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims.

Hereinafter, a dental blank according to an embodiment of the present disclosure will be described in detail with reference to FIGS. 1 to 11. In describing the present disclosure, detailed descriptions of related known functions or configurations are omitted so as not to obscure the subject matter of the present disclosure.

Figure 1:
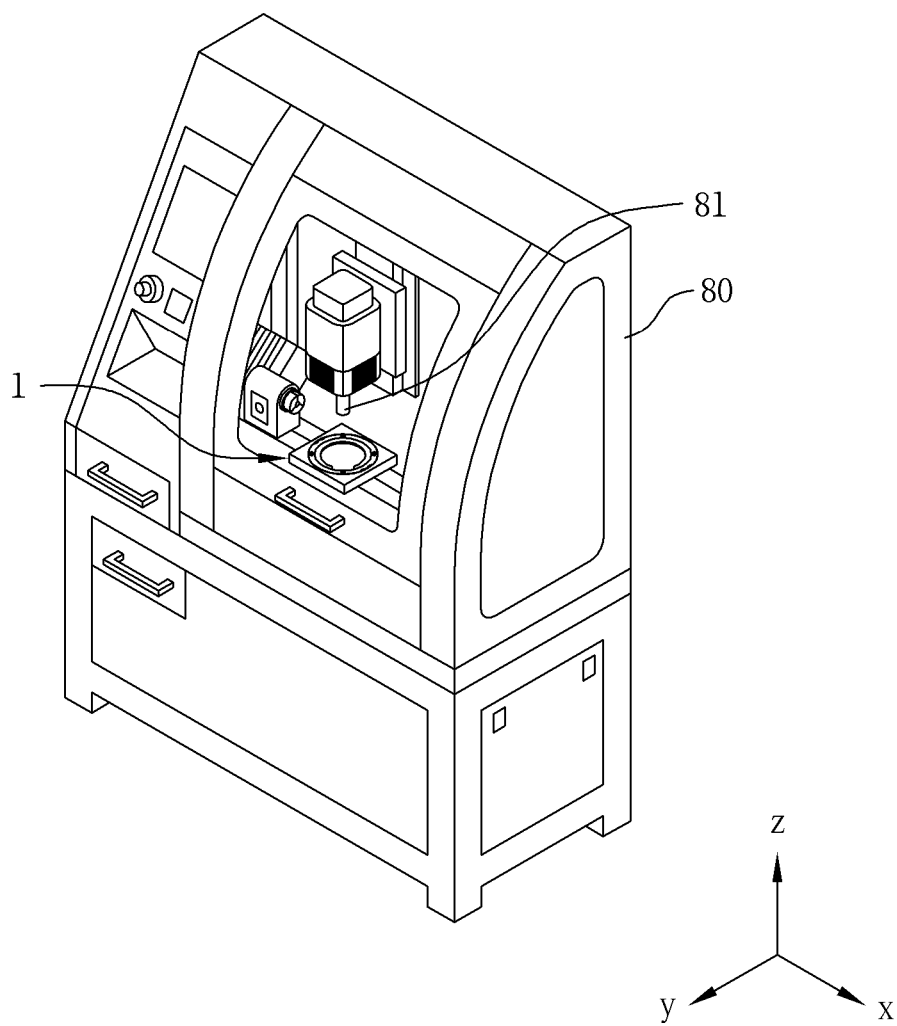
FIG. 1 is a view schematically illustrating an application example of a dental blank according to an embodiment of the present disclosure.
Figure 2:
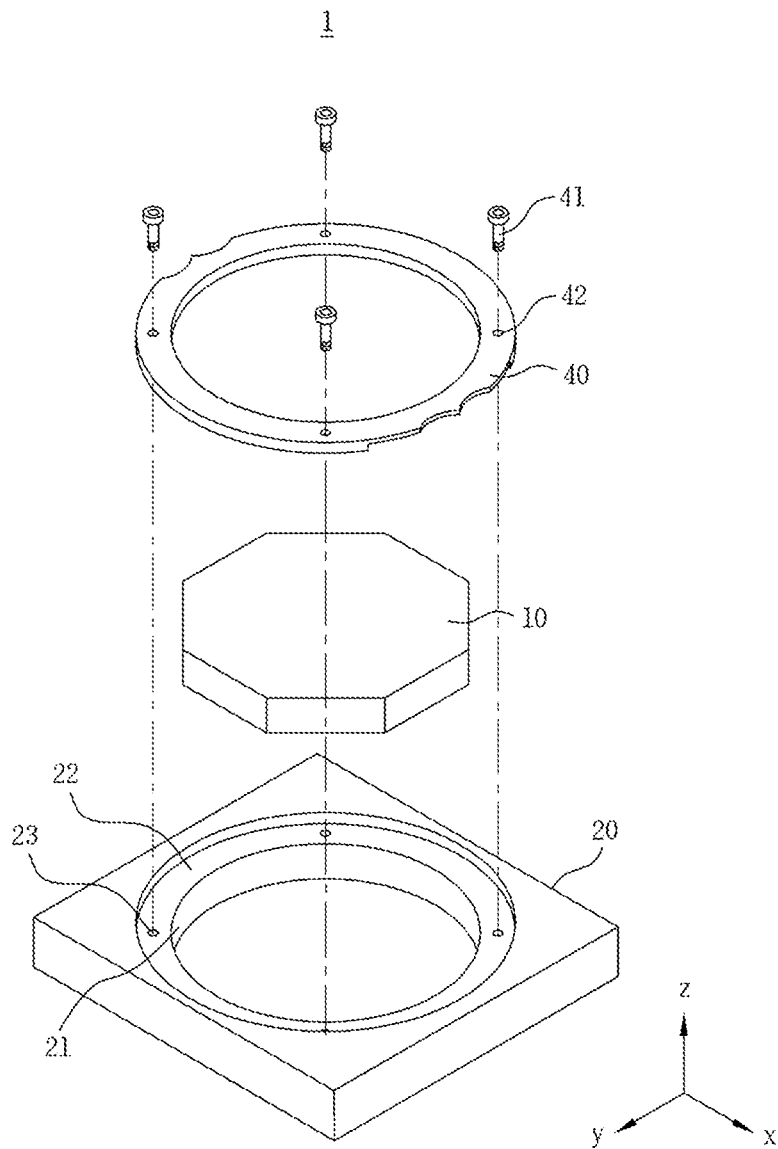
FIG. 2 is an exploded perspective view schematically illustrating the dental blank according to an embodiment of the present disclosure.
Figure 3:
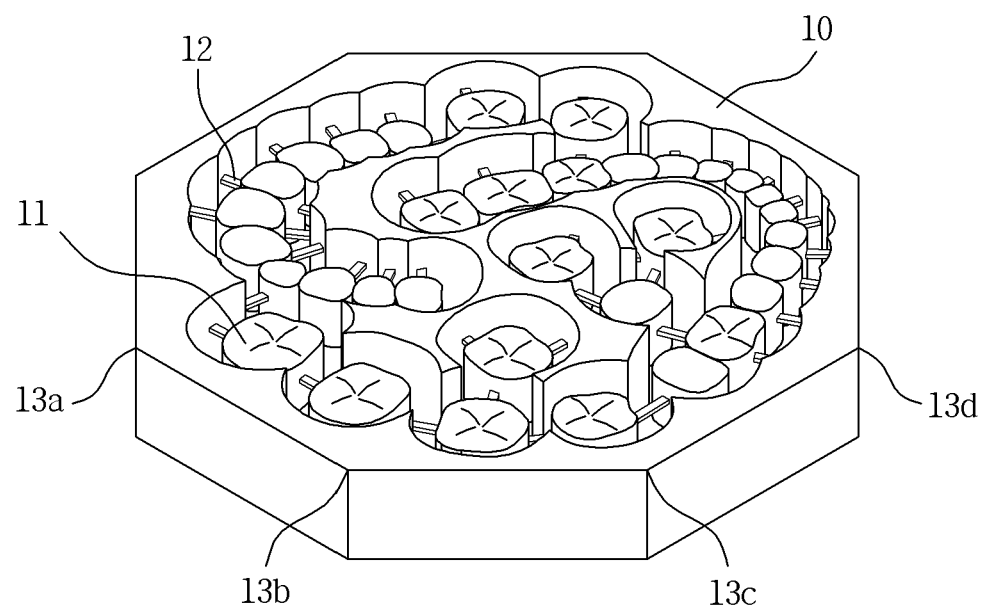
FIG. 3 is a perspective view schematically illustrating a material portion of the dental blank according to an embodiment of the present disclosure.
Figure 3:
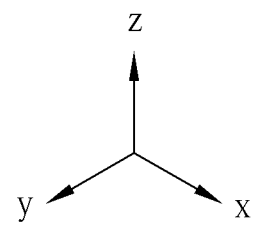
Figure 4:
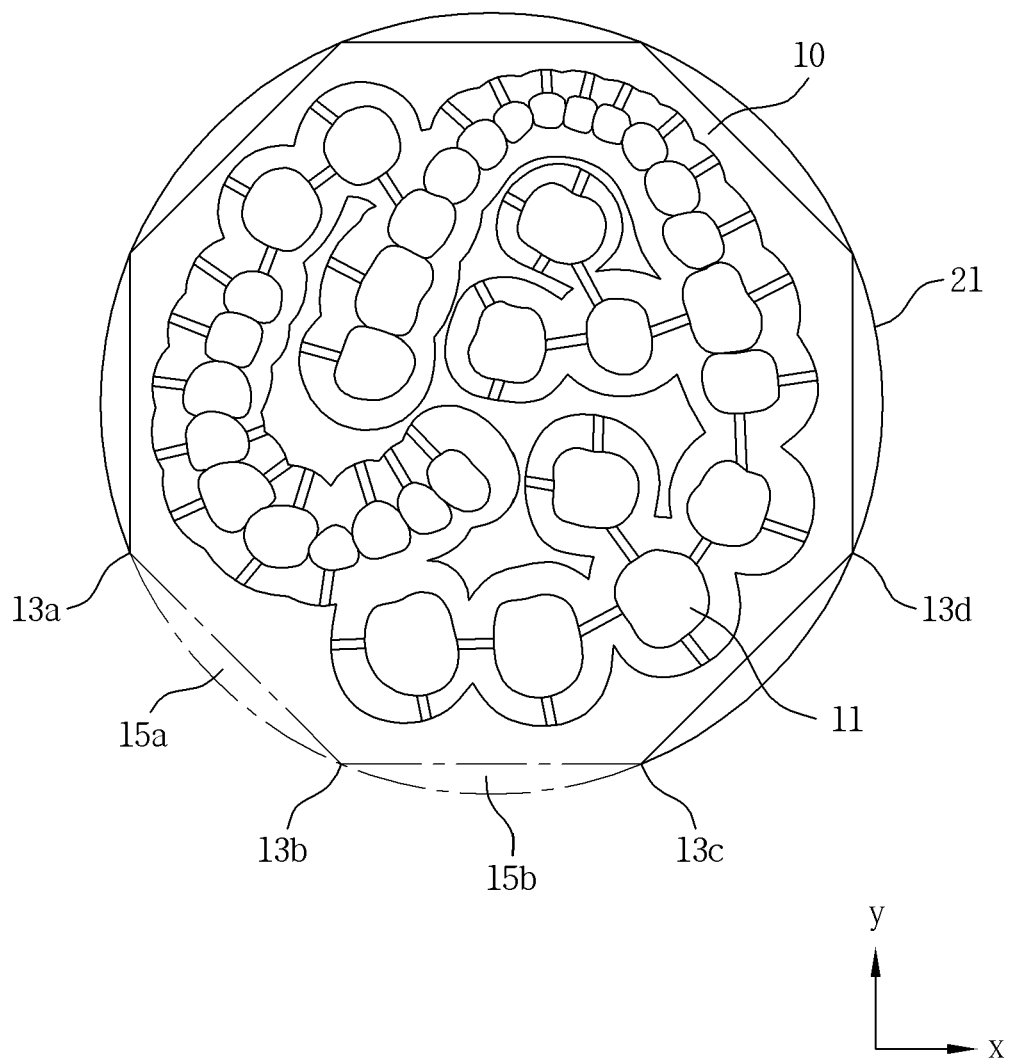
FIG. 4 is a plan view schematically illustrating the material portion and a seating groove of the dental blank according to an embodiment of the present disclosure.
Figure 5:
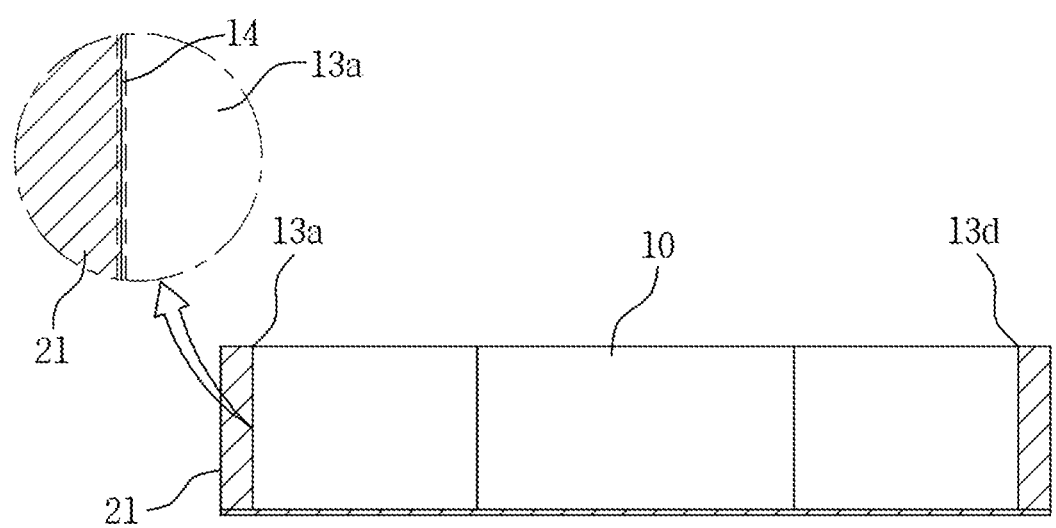
FIG. 5 is a cross-sectional view schematically illustrating the material portion and the seating groove of the dental blank according to an embodiment of the present disclosure.
Figure 6:
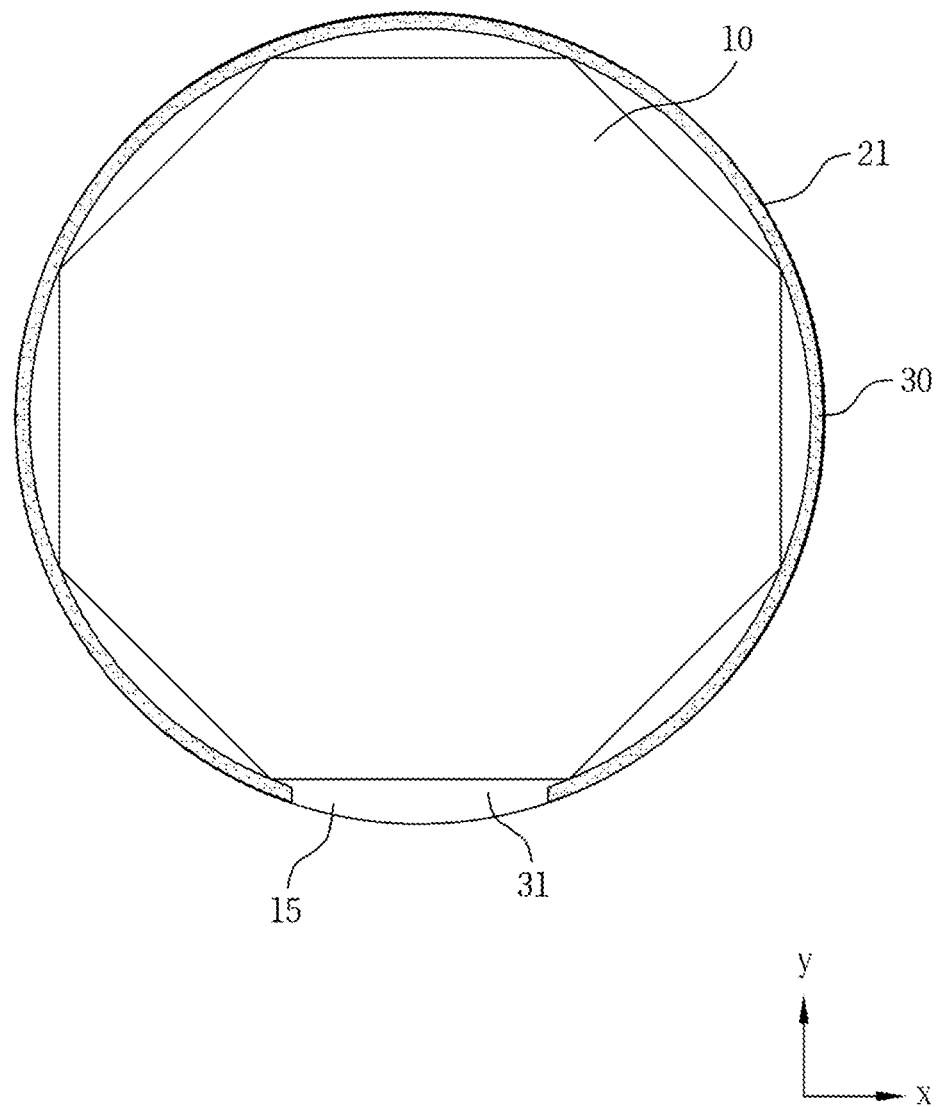
FIGS. 6 and 7 are plan views schematically illustrating the material portion, a guard portion, and the seating groove of the dental blank according to an embodiment of the present disclosure.
Figure 7:
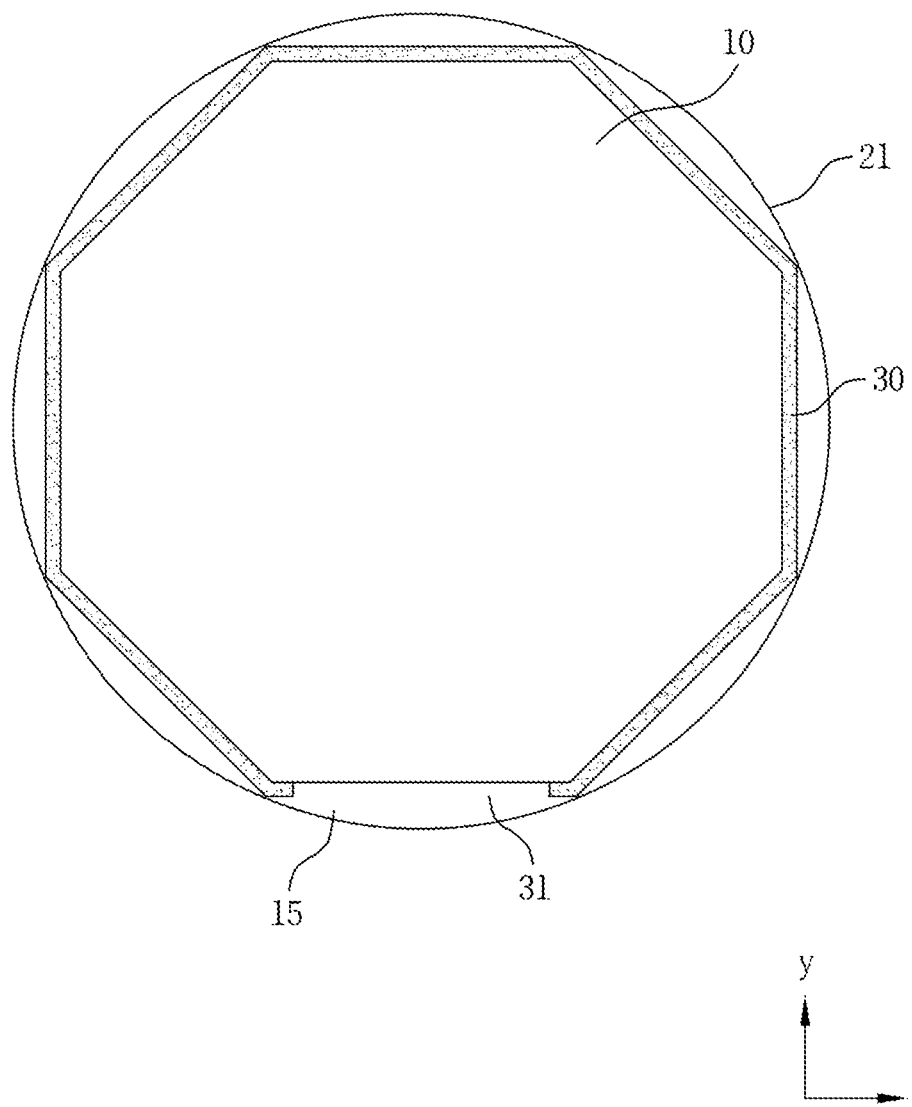
Figure 8:
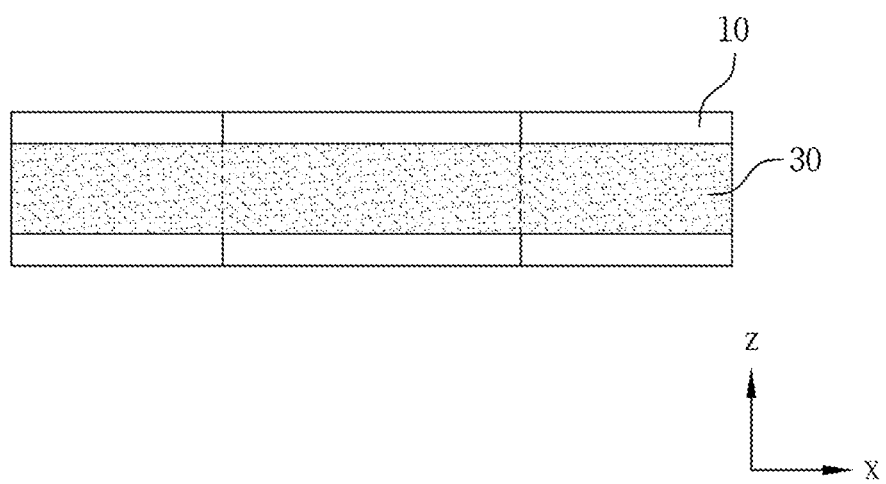
FIG. 8 is a cross-sectional view schematically illustrating the material portion, the guard portion, and the seating groove of the dental blank according to an embodiment of the present disclosure.
Figure 9:
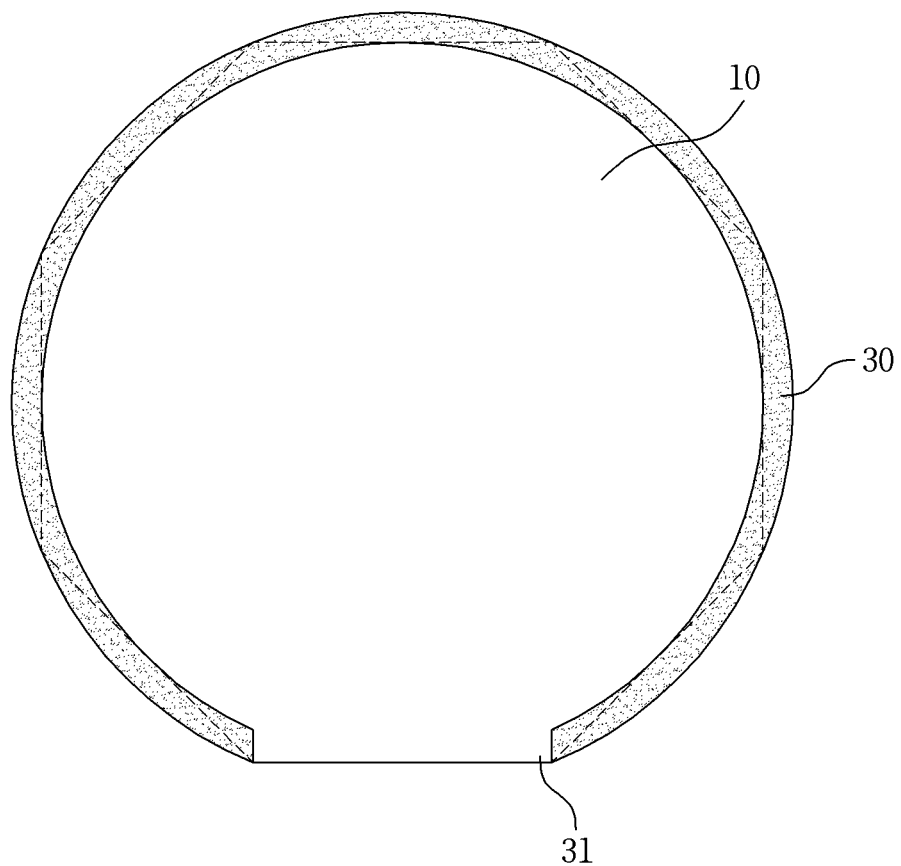
FIG. 9 is a plan view schematically illustrating the material portion and the guard portion of the dental blank according to an embodiment of the present disclosure.
Figure 9:
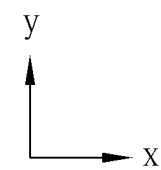
Figure 10:
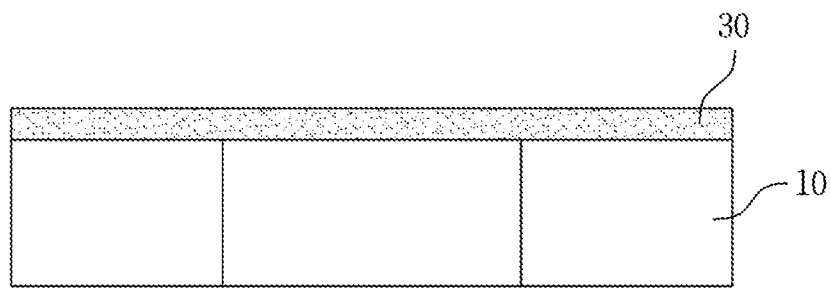
FIGS. 10 and 11 are cross-sectional views schematically illustrating the material portion and the guard portion of the dental blank according to an embodiment of the present disclosure.
Figure 11:
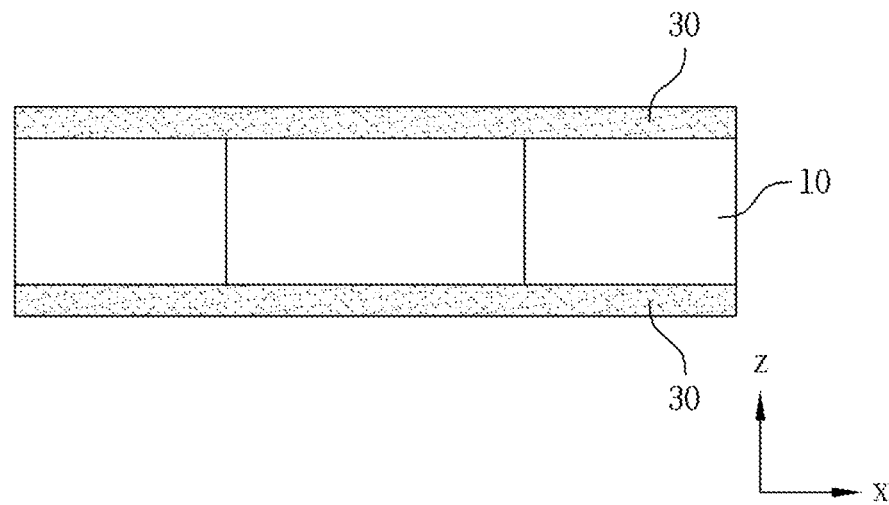
Figure 12:
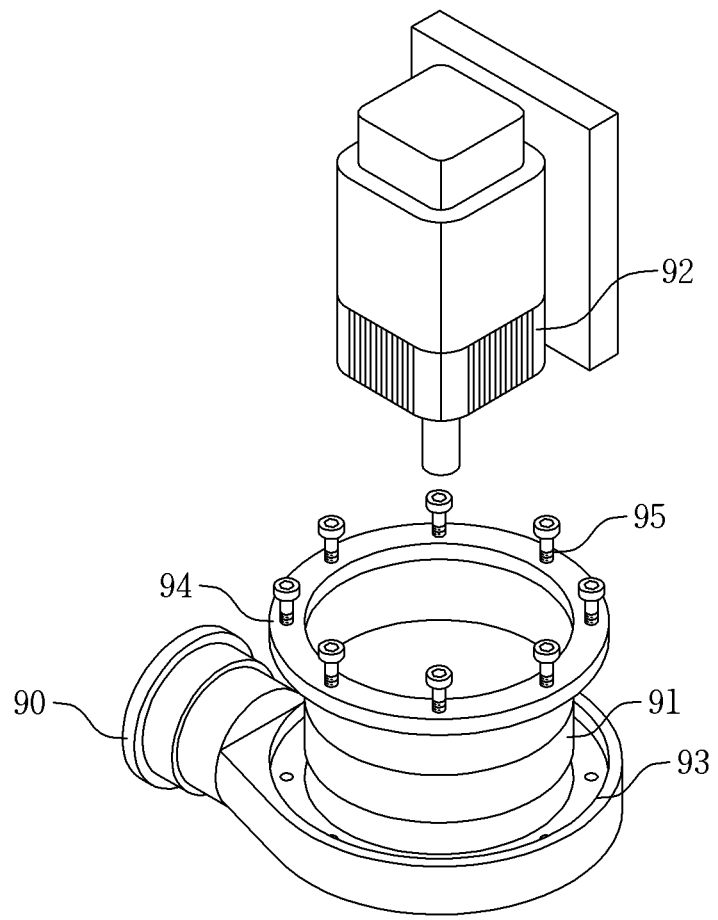
FIG. 12 is a perspective view schematically illustrating a processing jig and a workpiece of a conventional processing apparatus.

FIG. 1 is a view schematically illustrating an application example of a dental blank according to an embodiment of the present disclosure, FIG. 2 is an exploded perspective view schematically illustrating the dental blank according to an embodiment of the present disclosure, FIG. 3 is a perspective view schematically illustrating a material portion of the dental blank according to an embodiment of the present disclosure, FIG. 4 is a plan view schematically illustrating the material portion and a seating groove of the dental blank according to an embodiment of the present disclosure, FIG. 5 is a cross-sectional view schematically illustrating the material portion and the seating groove of the dental blank according to an embodiment of the present disclosure, FIGS. 6 and 7 are plan views schematically illustrating the material portion, a guard portion, and the seating groove of the dental blank according to an embodiment of the present disclosure, FIG. 8 is a cross-sectional view schematically illustrating the material portion, the guard portion, and the seating groove of the dental blank according to an embodiment of the present disclosure, FIG. 9 is a plan view schematically illustrating the material portion and the guard portion of the dental blank according to an embodiment of the present disclosure, and FIGS. 10 and 11 are cross-sectional views schematically illustrating the material portion and the guard portion of the dental blank according to an embodiment of the present disclosure.

As illustrated in FIGS. 1 to 3, a dental blank 1 may be applied to an artificial tooth processing apparatus. For example, the artificial tooth processing apparatus may be a processing apparatus 80 using a computer-aided design (CAD)/a computer-aided manufacturing (CAM). The processing apparatus 80 using CAD/CAM may process the dental blank 1 by grinding, milling, cutting, etc. The dental blank 1 may include a material portion 10, a seating portion 20, and a fixing portion 40.

The material portion 10 may be formed of at least one material selected from glass or glass-ceramic, polymer infiltrated glass, composite resin or hybrid material, unsintered or a partially sintered or a densely-sintered ceramic, and a metal or a metal alloy. The material portion 10 has characteristics such as high strength, thermal stability, and high corrosion resistance. Further, the material portion 10 with white or colored may be used alone or the material portion 10 with a mixture of white and colored may be used.

The material portion 10 may be processed to be a dental prosthesis 11 by the processing apparatus 80 using CAD/CAM. For example, when the dental blank 1 is mounted at the processing apparatus 80 using CAD/CAM, a processing tool 81 of the processing apparatus 80 is operated based on data converted through an outer surface coordinate of a tooth model obtained by scanning, and the material portion 10 of the dental blank 1 is cut such that the material portion 10 is processed to be the dental prosthesis 11.

Here, the dental prosthesis 11 may refer to a dental restoration, a dental filler, or a dental cast that may be used in restoring a part of a tooth or may be used in replacing a lost tooth when a loss of a tooth occurs by a tooth fracture, or by damaging or defecting of a tooth caused by a cavity, or the like. For example, the dental prosthesis 11 may be a crown, an inlay, an onlay, a veneer, a coping, a pontic, or a laminate that have various tooth forms.

In the material portion 10, a connection bar 12 that is connected to the dental prosthesis 11 may be additionally processed. The connection bar 12 may interconnect an inside of the material portion 10 and the dental prosthesis 11 that is processed, and the connection bar 12 may perform a function that allows the dental prosthesis 11 to be easily separated from the material portion 10. The material portion 10 may refer to a body that is machined by the processing apparatus 80 using CAD/CAM, or may refer to a body that is in a state in which the dental prosthesis 11 that is processed is included.

The seating portion 20 is connected with the processing apparatus 80 using CAD/CAM, and may include a seating groove 21, a coupling groove 22, and coupling holes 23. The seating groove 21 may have a circular groove shape that is recessed toward an inside of the seating portion 20. The seating groove 21 may be a space in which the material portion 10 is seated. When the material portion 10 is positioned at the seating groove 21, a circumference of an inner side surface of the seating groove 21 may be in contact with outer side angles of the material portion 10.

The coupling groove 22 may have a circular groove shape that is recessed toward the inside of the seating portion 20. The coupling groove 22 may be a space in which the fixing portion 40 is seated. The coupling holes 23 may have a hole shape that is formed toward the inside of the seating portion 20.

The fixing portion 40 may include fasteners 41 and fastening holes 42. The fasteners 41 are fastening devices such as a bolt and so on, and may be connected to the coupling holes 23 with being in a state in which the fasteners 41 are inserted in the fastening holes 42 that penetrate the fixing portion 40.

When the material portion 10 and the fixing portion 40 are respectively seated in the seating groove 21 and the coupling groove 22, the fasteners 41 may be coupled to the coupling holes 23 by passing through the fastening holes 42. That is, since the fasteners 41 are fastened to the coupling holes 23 by bolting when the fixing portion 40 is in a state in which the fixing portion 40 is in contact with a portion of the material portion 10, the fixing portion 40 may fix the material portion 10 to the seating portion 20.

Hereinafter, a structure of the material portion 10 of the dental blank 1 will be described in detail with reference to FIGS. 4 and 5.

As illustrated in FIGS. 4 and 5, the material portion 10 has a polygonal shape in a cross-section, and may include a plurality of outer contacting portions 13 that are positioned around an edge of the material portion 10. The outer contacting portions 13 may be formed to correspond to the polygonal shape of the material portion 10. For example, when the material portion 10 is formed in an octagonal shape, eight outer contacting portions 13 may be formed at the material portion 10.

When the material portion 10 is accommodated in the seating groove 21, each of the outer contacting portions 13a, 13b, 13c, and 13d may be in contact with an inner side of the seating groove 21. Since the material portion 10 has the polygonal shape, each of the outer contacting portions 13a, 13b, 13c, and 13d may be in linear contact with an inner side surface of the seating groove 21 along an insertion direction that the material portion 10 is inserted into the seating groove 21. In other words, when the material portion 10 is inserted into the seating groove 21, as illustrated in the expanded circle in FIG. 5, linear contacting portions 14 that are in linear contact along a z-axis direction may be formed between the inner surface of the seating groove 21 and the outer contacting portions 13a.

A conventional workpiece is formed in a disc shape, and when the conventional workpiece is accommodated in a seating table, the entire of circular perimeter of the workpiece is in surface contact with and fixed to an inner surface of the seating table. In this state, when an external force is applied to the workpiece, the external force is spread to the entire of the workpiece along a wide surface contacting area between the workpiece and the seating table that is solid, so that the entire region of the workpiece may be broken.

However, since the material portion 10 of the present disclosure is formed in the polygonal shape, the outer contacting portions 13 and the seating groove 21 are in linear contact with each other when the material portion 10 is accommodated in the seating groove 21. That is, the linear contacting portions 14 that are relatively narrow are formed between the material portion 10 and the seating groove 21, so that an external force does not spread to the entire of the material portion 10 even if the external force is applied to the material portion 10. Therefore, the material portion 10 of the present disclosure is prevented from being entirely broken, so that the consumption of the material portion 10 caused by a crack may be reduced.

Meanwhile, when the material portion 10 is accommodated in the seating groove 21, tool entrance portions 15 may be formed between a space of the seating groove 21 and the outer contacting portions 13. The tool entrance portions 15 may be separation spaces between the material portion 10 that is formed in the polygonal shape and the seating groove 21 that is formed in a circular shape. For example, the tool entrance portions 15 may be spaces having a circular arc formed between a pair of outer contacting portions 13a and 13b and the inner surface of the seating groove 21. When the material portion 10 is formed in an octagonal shape, eight tool entrance portions 15 may be formed. The tool entrance portions 15 may be spaces in which the processing tool 81 of the processing apparatus 80 enters, or may be spaces in which the processing tool 81 is accommodated.

In the conventional workpiece formed in the disc shape, since the conventional workpiece is in close contact with the seating table that is formed in the circular shape, a separation space cannot be formed, so that a processing tool begins processing the workpiece from a top portion of the workpiece. Therefore, when the processing tool begins in contact with the top surface of the workpiece, the workpiece may be broken since a stress is concentrated on a contact surface instantaneously. In addition, conventionally, a region where the workpiece is in close contact with the seating table or with a fixing table and a surrounding region are defined as a dead space that is a space impossible to process, so that a productivity of manufacturing a dental prosthesis is low.

However, in the dental blank 1 proposed in the present disclosure, by forming the tool entrance portions 15 between the material portion 10 that is formed in the polygonal shape and the seating groove 21 that is formed in the circular shape, since a process begins in a state in which the processing tool 81 enters into a side surface of the material portion 10, an inserting load of the processing tool 81 is low and a stress concentration phenomenon may be prevented. In addition, when the processing tool 81 begins processing from the tool entrance portions 15, a border region of the material portion 10 may be processed, so that the dead space of the material portion 10 may be reduced and production efficiency of the dental prosthesis 11 may increase. Moreover, when the dental prosthesis 11 is processed at the edge of the material portion 10, since an amount of resistance applied to the processing tool 81 is lower than that of when the dental prosthesis 11 is formed at the center portion of the material portion 10, an abrasion of the processing tool 81 may be reduced and a manufacturing speed of the dental prosthesis 11 may increase.

The material portion 10 may be a polygonal shape having four angles to 32 angles in a cross-section, and may preferably have an octagonal shape. Here, the octagonal shape is not a mathematically perfect octagonal shape and should be understood to mean the octagonal shape when viewed in its entirety at a glance. In the present disclosure, the term "octagonal shape" may be understood to include the former and the latter.

A diameter of the material portion 10 that is the longest diameter of the octagonal in a cross-section of the material portion 10 may be 50 mm or more, and may preferably be 80 mm to 150 mm. A thickness of the material portion 10, i.e., a height of the material portion 10 in the z-axis direction may be 5 mm or more. The thickness of the material portion 10 may be smaller than the diameter of the material portion 10.

As illustrated in FIGS. 6 to 11, the material portion 10 may include a guard portion 30. The guard portion 30 may be positioned to be in contact with a side portion of the material portion 10. The guard portion 30 is manufactured of a material such as plastic, rubber, silicone, and so on, so that the guard portion 30 may relieve a stress, an impact, etc., that are transferred from the processing apparatus 80, thereby allowing the material portion 10 to be protected. The guard portion 30 may be attachable to and detachable from the material portion 10, and may be reused.

The guard portion 30 may have an opening portion 31 at a side portion thereof. Since the opening portion 31 may be positioned to face the tool entrance portions 15, the material portion 10 may be processed directly through the opening portion 31 even if the processing tool 81 begins processing during in a state in which the processing tool 81 is positioned at the tool entrance portions 15.

As illustrated in FIG. 6, the guard portion 30 is formed in a circular shape, and may be positioned between the seating groove 21 and the material portion 10 by surrounding the side surface of the material portion 10. An outer side of the guard portion 30 may be in surface contact with the seating groove 21, and an inner side of the guard portion 30 may be in linear contact with the polygonal shape of the material portion 10. In this case, the guard portion 30 may protect the material portion 10 from an external force transferred from the processing apparatus 80.

As illustrated in FIG. 7, the guard portion 30 may be formed in a shape that correspond to the polygonal shape of the material portion 10. For example, when the material portion 10 is formed in an octagonal shape, a cross-section of the guard portion 30 may be an octagonal shape. In this case, since the guard portion 30 is positioned to surround the side surface of the material portion 10, a processing vibration generated while the material portion 10 is processed may be attenuated, and it is possible to prevent the processing vibration from spreading to the processing apparatus 80.

As illustrated in FIG. 8, the guard portion 30 may be positioned to surround a portion of the side surface of the material portion 10. That is, a thickness of the guard portion 30, i.e., a height of the guard portion 30 in the z-axis direction may be smaller than the thickness of the material portion 10. In this case, when a cutting movement of the processing tool 81 is performed on the material portion 10, interference that occurs between the guard portion 30 and the processing tool 81 may be prevented.

As illustrated in FIGS. 9 and 10, the guard portion 30 may be positioned at an upper portion of the material portion 10. In this case, the guard portion 30 is positioned between the material portion 10 and the fixing portion 40, and the material portion 10 may be protected from a fastening pressure that may be generated when the fixing portion 40 is fastened to the seating portion 20 by bolting.

As illustrated in FIG. 11, the guard portion 30 may be positioned at a lower portion of the material portion 10. In this case, by the guard portion 30 positioned between the material portion 10 and the seating portion 20, the guard portion 30 absorbs a stress generated when the processing tool 81 processes the material portion 10, so that the guard portion 30 may provide a cushioning effect to the material portion 10.

In summary, the guard portion 30 may protect the material portion 10 by being in contact with the side portion of the material portion 10, and the guard portion 30 may be positioned at the side surface, the lower portion, or the upper portion of the material portion 10. By the dental blank 1 according to the present disclosure including the guard portion 30, the material portion 10 does not directly contact the seating portion 20 or the fixing portion 40, so that the material portion 10 may be protected from an external force, thereby being capable of preventing the material portion 10 from breakage.

Although the preferred embodiments of the present disclosure have been described above in detail, the scope of the present disclosure is not limited thereto. Those skilled in the art will appreciate that various modifications and improvements are possible, without departing from the basic concept of the present disclosure as defined in the appended claims, and also fall within the scope of the present disclosure.

What is claimed is:

1. A dental blank comprising:
   a seating portion comprising a seating groove having a circular shape in a cross-section and having a continuous circular inner side surface,
   a guard portion disposed in contact with the continuous circular inner side surface and having a substantially ring shape in a cross-section thereof, the guard portion including a first end and a second end facing the first end and including an opening portion defined by the first end and the second end therebetween,
   a material portion disposed on the guard portion comprising a plurality of outer contacting edges in linear contact with a continuous circular inner side surface of the guard portion, and having a polygonal shape in a cross-section in which the polygonal shape is distinct from the circular shape,
   wherein one side of the material portion, defined by two of the plurality of outer contacting edges, is disposed adjacent to the opening portion of the guard portion,
   and a tool entrance portion, defined by the one side of the material portion, the first end of the guard portion, the second end of the guard portion, and the circular shape of the seating groove, is formed due to a difference in shape between the circular shape of the seating groove and the polygonal shape of the material portion.

2. A dental blank comprising:
   a seating portion comprising a seating groove having a circular shape in a cross-section thereof and having a continuous circular inner side surface;
   a guard portion including a plurality of outer edges and a plurality of outer sides connecting the respective plurality of outer edges, and further including a plurality of inner edges and a plurality of inner sides connecting the respective plurality of inner edges, thereby defining a hollow space therein, wherein the plurality of outer edges are disposed on and in contact with the continuous circular inner side surface of the seating groove and wherein one of the plurality of outer sides of the guard portion includes an opening; and
   a material portion having a polygonal shape, disposed in the hollow space of the guard portion and including a plurality of sides, wherein the plurality of sides of the material portion are disposed on and in contact with the plurality of inner sides of the guard portion,
   wherein the guard portion has a first end and a second end, both of which defining the opening on the one of the plurality of outer sides thereof, and one of the plurality of sides of the material portion is disposed adjacent to the opening of the guard portion, and
   wherein a tool entrance portion, defined by the one of the plurality of sides of the material portion, the first end of the guard portion, the second end of the guard portion, and the circular shape of the seating groove, is disposed due to a difference in shape between the circular shape of the seating groove and the polygonal shape of the material portion.

* * * * *